United States Patent [19]
Kanno

[11] Patent Number: 5,796,690
[45] Date of Patent: Aug. 18, 1998

[54] DISC CONTROLLER WITH IMPROVED DATA SYNC AND RE-SYNC MARK DETECTION

[75] Inventor: Naotaka Kanno, Kanagawa, Japan

[73] Assignee: NEC Corporation, Tokyo, Japan

[21] Appl. No.: 890,029

[22] Filed: Feb. 4, 1997

Related U.S. Application Data

[63] Continuation of Ser. No. 428,726, Apr. 25, 1995, abandoned.

[30] Foreign Application Priority Data

Apr. 26, 1994 [JP] Japan .................. 6-088909

[51] Int. Cl.$^6$ .................................. G11B 7/00
[52] U.S. Cl. .......................... 369/48; 369/124
[58] Field of Search ............... 369/48, 49, 124, 369/54, 58, 47, 59, 60

[56] References Cited

U.S. PATENT DOCUMENTS

| | | |
|---|---|---|
| 5,416,760 | 5/1995 | Masood et al. ................ 369/59 |
| 5,446,715 | 8/1995 | Satomura ..................... 369/49 |
| 5,604,723 | 2/1997 | Kikuta ........................ 369/53 |

FOREIGN PATENT DOCUMENTS

| | | |
|---|---|---|
| 61-292270 | 12/1986 | Japan . |
| 1124158 | 5/1989 | Japan . |
| 381219 | 12/1991 | Japan . |

OTHER PUBLICATIONS

M. Onoe, "Optical Disc Techniques", Radio Giho Sha, pp. 181–187 and 258–269.

*Primary Examiner*—Nabil Hindi
*Attorney, Agent, or Firm*—Whitham, Curtis & Whitham

[57] ABSTRACT

In response to a supply of sync and re-sync mark detection failure status signals for data to be written or read, a re-sync mark detection window expanding device advances a timing of opening a re-sync mark detection window to be earlier than an instant of generation of the sync or re-sync detection success status signal, thereby improving the possibility of detection of the next re-sync mark.

13 Claims, 19 Drawing Sheets

DISC CONTROLLER WITH IMPROVED DATA SYNC AND RE-SYNC MARK DETECTION

This application is a continuation of U.S. patent application Ser. No. 08/428,726, filed on Apr. 25, 1995, now abandoned.

BACKGROUND OF THE INVENTION

The present invention relates to a disc controller and, more particularly, to a disc controller of optical magnetic discs and the like with improved read-out data sync signal detection characteristics.

Optical magnetic disc apparatuses using an optical magnetic disc as a recording media capable of high writing density and additional writing of data are expected for files for data processing and audio video (AV) processing. FIG. 19 shows conventional sector formats of 130 and 90 mm optical magnetic discs. As shown, one sector comprises a preformat area and an MO area. In the preformat area is written when the optical magnetic disc is manufactured, data including ID information such as sector and address marks and track and sector numbers. The MO area is a user data areas. Among the data written in this area are user data, sync mark placed at the forefront of the user data for synchronization when writing the user data, and re-sync mark inserted for re-synchronization in the user data at a predetermined interval. What concerns the modulation system for these optical magnetic discs, i.e., a 2–7 modulation system, and also sync/re-sinc mark detection operation, is disclosed in, for instance. "Optical Disc Techniques", supervised by Morio Onoe, Radio Giho Sha, 1988. pp. 181–187 and 258–269. Among the disclosed contents, only those which directly pertain to the present invention will be described. The optical magnetic disc apparatus includes an optical magnetic disc controller for controlling a disc drive of the apparatus and also serving as an interface for write and read data.

FIG. 14 shows a block diagram of the disc controller of a prior art optical magnetic disc apparatus together with various units related thereto. The disc controller 2 connected to an external CPU 1 via a bus 6 a disc drive 3 which includes a drive mechanism for driving a disc type file as recording medium and a write/read head and writes and reads data in and out of the optical magnetic disc, a buffer memory 4 for tentatively retaining write and read data to and from the optical magnetic disc, and an SCSI bus 5 for connecting the disc controller 2 to a host system (not shown).

The disc controller 2 comprises a formatter 21 for converting read data DR into parallel data DP, an SCSI controller 22 connected to the SCSI bus 5 for receiving commands from the host system connected to the SCSI bus 5, a disc interface 23 connected to the disc drive 3 and for converting read-out 2-7 modulation read data DMR into NRZ type read data DR, an error detecting/correcting unit 24 for detecting and correcting data errors at the time of reading the data or generating error detecting/correcting codes at the time of writing the data, a FIFO 26 for tentatively storing the parallel data DP output from the formatter 21, and a DMA controller 25 for executing data transfer between the FIFO 26 and the buffer memory 4 and also between the SCSI controller 22 and the buffer memory 4.

The formatter 21 includes a data transfer function unit 11, as shown in FIG. 15, for high speed transfer of the read data and dummy data in order to flexibly adapt to various formats such as 512 and 1024 byte/sectors corresponding to the 130 mm disc and 512 byte/sector corresponding to the 90 mm disc as prescribed in the literatures 1 and 2.

Referring to FIG. 15, the transfer function unit 11 includes a CPU 14 having a mark detecting/judging section 141, which is supplied with sync mark detection success and failure status data S11 and S12 and re-sync mark detection success and failure status data R13 and R14 and detects judgment target sector as a result of detection of these marks. The unit 11 further includes an operating program 13 of the CPU 14, a dummy data generator 12 for generating dummy data DD, a frequency divider 16 for frequency dividing an NR data synchronization clock CKN to generate a read data transfer timing signal DRT for every predetermined number of clock pulses, generally for every one byte (8 bits), an output controller 17 for outputting output data DT in response to the supply of either parallel data DP or dummy data DD, an output buffer 19 for tentatively storing the data DT and outputting output data DO, and a shift register 20 for converting the read data DR into the parallel data DP. The unit 11 executes such operations as the judgment of the result of detection of the sync and re-sync marks, detection of the target sector, transfer of the data, etc.

Now, the reading operation of the data recorded on the disc via the disc drive 3 of the disc controller in the prior art, will be described with reference to the FIGS. 14 and 15. First, when the CPU 1 detects the reception of a read command supplied via the SCSI bus 5 by the SCSI controller 22, it extracts parameters such as numbers of the tracks and sectors and, number of sectors to be processed for the target of reading from the data series of the read command data, then sets these parameters in respective registers of the formatter 21, DMA controller 25, disc interface 23, error detecting/correcting unit 24 and FIFO 26 to start the disc controller 2.

As disclosed in literature 3, the disc interface 23 opens sector mark detection window WSE to start an operation of detecting the sector mark in 2–7 modulated read data DR2 which is supplied from the disc drive 3 concurrently with clock CK2. Upon detection of the sector mark, the window WSE is closed and sector mark detection success status data SSM is supplied to the formatter 21. Then, the sector mark and read data DR2 succeeding the sector mark into NRZ type read data and outputs the read data DR and clock CKN for synchronization of the NRZ type data is supplied to the formatter 21. Concurrently, address mark detection window WA is closed and the address mark is detected from the read data DR2. Upon detection of the address mark, the window WA is closed and address mark detection success status data SAM is supplied to the formatter 21. The foregoing operations are repeated according to the sector format of the read target disc. Subsequently, the detection operations of the sector and address marks are repeated by the disc interface 23 until the formatter 21 outputs target sector detection success status data TSD.

Referring to FIG. 16, the operation based on the program 13 is executed as follows. First, a check is made in a step P1 as to whether there is a success in sync mark detection. If there is a success in sync mark detection, a step P2 is executed to cause transfer of normal data. Otherwise, a step P3 is executed to cause transfer of dummy data. Subsequently, a check is made in a step P4 as to whether there is a success in re-sync mark detection. If there is a success in re-sync mark detection, transfer of normal data is effected in a step P5. Otherwise, transfer of dummy data is effected in a step P6. Then, a check is made in a step P7 as to whether transfer of one sector data has been completed.

If the transfer has not yet been completed, the routine goes back to the step P4. If completed, an end is brought to the routine. When, the program 13 is executed by the CPU 14 and the address mark detection success status data SAM is input subsequent to sector mark detection success status data SSM, the formatter 21 starts retrieval of the target section by comparing the track and sector ID of the target sector that has been set and ID read out from the disc. If the target sector detection is succeeded, target sector detection success status data TSD is supplied to the disc interface 23. The disc interface 23, responsive to the recognition of the target sector detection success by the formatter 21 based on the target sector detection success status data TSD, opens sync mark detection window WS, executes an operation of detecting sync mark from the read data DR2, and outputs sync mark detection success status data S11 to the formatter 21 responsive to the success of the sync mark detection. In the formatter 21, the shift register 20 in the transfer function section 11 successively converts the read data DR supplied in synchronism to the clock CKN into the parallel data DR and supplies the parallel data DR to the output controller 17. When a read data output permission signal ARD output from the mark detecting/judging section 141 and the read data transfer timing signal DRT become simultaneously active, the output controller 17 supplies the parallel data DP to the output buffer 19, whereby data between sync and re-sync marks is output as the output data DO.

Concurrently with the data output operation of the formatter 21, the read data transfer timing signal DRT is counted, and when the number of times of data transfer is in accord with the number of pieces of data between the sync and re-sync marks or between the first and second re-sync marks, data transfer completion status data SED is generated. In response to the generation of the data transfer completion status data SED, the disc interface 23 opens the sync mark detection window WR to execute the re-sync mark detection. If the re-sync mark detection is sucessful, re-sync mark detection success status data R13 is supplied to the formatter 21. In response to receipt of the re-sync mark detection success status data R13, the formatter 21 executes the transfer of data succeeding the re-sync mark in the same manner as the transfer of the data succeeding the sync mark, and repeatedly executes the re-sync mark detection and data transfer until completion of transfer of data of one sector.

Concurrently with the operations of the disc interface 23 and formatter 21, the error detecting/correcting unit 24 executes error detection and correction for the data transferred to the buffer memory 4 in units of sectors, and repeatedly executes the operation until completion of the read process on data of the number of sectors to be processed.

In case when the disc interface 23 fails in the sync or re-sync mark detection, an area for writing data generated by error correction has to be provided, in which dummy data of a quantity corresponding to the interval between two successive re-sync marks in written as in, for instance, an optical disc processing apparatus disclosed in Japanese Patent Laid-open No. Heisei 1-124158. To this end, the CPU 14 sets a dummy data output permission signal ADD to be active and outputs this active signal to the output controller 17. The output controller 17 executes an operation of outputting dummy data DD from the dummy data generator 12 as format output data DO based on the read data transfer timing signal DRT.

FIG. 17 shows the circuit structure of the mark detecting/judging section 141 in the transfer function section 11 and the output controller 17. The mark detecting/judging section 141 has an OR gate G41 in which for ORing the sync and re-sync mark detection failure status data S12 and R14 are supplied to generate the dummy data output permission signal ADD, and an OR gate G42 in which the sync and re-sync mark detection success status data S11 and R13 are supplied to generate a read data output permission signal ARD. The output controller 17 has gated buffers B71 and B72, which respectively output the dummy and parallel data DD and DR supplied in response to the supply of the dummy and read data output permission signals ADD and ARD, a gated buffer B73 for outputting either one of the outputs of the gated buffers B71 and B72 as transfer data DT in response to the supply of the read data transfer timing signal DRT, and a counter C71 for counting the read data transfer timing signal DT and generating data transfer completion status data SED.

In operation, the sync and re-sync mark detection failure status data S12 and R14 are input to the OR gate G41, and the sync and re-sync mark detection success status data S11 and R13 to the OR gate G42. Based on the outputs of the OR gates G41 and G42, the status of the sync and re-sync mark detection is judged. In the case of failure in the sync and re-sync mark detection, the dummy data output permission signal ADD from the OR gate G41 for enabling the buffer B71 is made active, thus outputting the dummy data DD. In case of success in the detection, the read data output permission signal ARD for enabling the buffer B72 is made active, thus outputting the parallel data DP. Further, the read data transfer timing signal DRT received by the counter C71 is counted. When the count becomes equal to the number of bytes of data between the sync mark and the first re-sync mark or between two successive re-sync marks, a carry is generated, which is output as the data transfer completion status data SED. When reading data, the data detecting/correcting unit 24 executes an operation of error detection and correction for the data written in the buffer memory 4, i.e., data written by the user among the data written in the MO area, and the error detection and correction concerning the sync and re-sync marks are not important for the present invention and will not be described.

Now, an operation in case when the prior art disc controller 2 fails in the re-sync mark detection, will be described under the assumption that the re-sync marks have been ruptured. First, when the disc interface 23 can detect no re-sync mark from the read data RD2, a process related to the measure of improving the possibility of detecting the next input re-sync mark with increased width of the re-sync mark detection window WR and a process of dummy data transfer to the FIFO 26 by the formatter 21, are executed dependent on the circumstances at the time of the re-sync mark detection failure, as in, for instance, a digital signal reproducing system disclosed in Japanese Patent Publication No. Heisei 3-81219. Regarding these processes, priority is given to the dummy data transfer since it is necessary to start the transfer operation of the read data RD to the FIFO 26 immediately after the generation of re-sync mark detection success status data R13 and it is possible to open the re-sync detection window WR when or only when the data transfer completion status data SED generated after completion of the read data DR. Under the above conditions, the time required for the dummy data transfer and the re-sync mark interval on the data format, i.e., the data input time between two successive re-sync marks supplied to the disc controller 23.

Referring to FIG. 18, showing a time chart of operation in case of failure in the re-sync mark detection, the re-sync mark detection failure status data R14 is generated at the end of the re-sync mark detection window WR, and the formatter 21, as in the case of normal re-sync mark detection, executes an operation of transferring dummy data to the FIFO 26 for every byte of the input data. Thus, most of the re-sync mark interval is occupied by the dummy data transfer time, as shown in (e). Further, assuming an operation of transferring normal data which is generated when the disc interface 23 succeeds in the next re-sync mark detection, the formatter 21 outputs the data transfer completion status data SED after the completion of the dummy data transfer and then waits the re-sync mark success or failure status data R13 or R14. Meanwhile, the disc interface 23, after confirming the data transfer completion status data SED, opens the re-sync mark detection window WR, as shown in (e) and (b). Thus, when it is intended to execute the operation of opening the window WR early during the dummy data transfer execution to increase the window width in order to improve the next re-sync mark detection success possibility, the window WR can not be opened because the data transfer completion status data SED is not generated, until completion of the dummy data transfer.

In the event of the re-sync mark detection failure, the above prior art disc controller executes the process of dummy data transfer to the FIFO by the formatter, since it is impossible to open the re-sync mark detection window until completion of the dummy data transfer due to the generation of the data transfer completion data, the width of the window is inevitably set to be small. Therefore, the next re-sync mark detection possibility is reduced. Further, with increase of the recurring re-sync mark detection failure possibility, the amount of the dummy data to be written in the buffer memory is increased there by increasing the error correction amount, this makes the burden to be higher for the error detector/corrector. Further, when the sync mark detection failure, it is recognized that the reliability of the pertinent sector concerning the reading and writing of data is too low to withstand use. Thus, that sector is dealt with as defective sector, and its subsequent use is prohibited, thus reducing the utility factor of the disc.

SUMMARY OF THE INVENTION

An object of the present invention is therefore to provide a disc controller capable of solving the foregoing problems.

According to the present invention, there is provided a disc controller comprising: disc drive controller means including a drive mechanism for driving a disc type file as a recording medium for writing and reading data therein and therefrom in units of blocks and a write/read head, disc interface means for supplying write data as write target data formatted in a predetermined format to the disc drive means and receiving lead signal therefrom, data formatting means for generating the write data signal from input and supplying the write data signal to the data interface means and for receiving the read signal from the disc interface means to output the same signal as predetermined read signal, FIFO means for tentatively holding the read data for storing the same data in a buffer memory, and DMA controller means for controlling the transfer of data to the buffer memory; the disc interface means including sync/re-sync mark detection status signal generating means for generating a first and a second sync mark detection status signals representing start of the data area of the read data and respectively corresponding to the success and failure of a sync mark for synchronization and also generating a first and a second re-sync mark detection status signals respectively corresponding to the success and failure of a first one of re-sync marks for re-synchronization each inserted for each cycle of the read data, and detection window opening means for opening a re-sync mark detection window for detecting the second re-sync mark in response to the supply of a data transfer end status signal indicative of the end of transfer of the read data; the data formatting means including read data transferring means for transferring at a predetermined first transfer rate to the FIFO means a predetermined first number of pieces of read data between the sync mark and the first re-sync mark in response to the supply of the first sync mark detection status signal and the first number of pieces of read data between the first and the next second re-sync marks and also generating the data transfer end status signal for each transfer of the first number of pieces of data is ended; the disc controller further comprising: re-sync mark detection window expanding means for controlling the detection window opening means to advance the timing of opening the re-sync mark detection window for detection of the second re-sync mark in response to the supply of the second sync and re-sync mark detection status signals with respect to the instance of generation of the first sync or re-sync mark detection status signal.

The data formatting means includes: dummy data generating means for causing the re-sync mark detection window expanding means to generate dummy data substituting for the read data; detection failure judging means for generating a detection failure signal when judging the failure of detection of the sync and re-sync marks in response to the supply of the second sync and re-sync mark detection status signals; and dummy data transferring means for transferring the dummy data at a second rate of transfer rate higher than the first rate of transfer in response to the supply of the detection failure signal and generating the data transfer end status signal whenever the transfer of the predetermined number of pieces of dummy data is ended.

The DMA controller means comprises: transfer address updating means in response to the supply of the detection failure signal for updating the transfer address value in the buffer memory for storing the read data by an amount corresponding to a predetermined value; and DMA controller means in response to the supply of the first sync and re-sync mark detection status signals for controlling the transfer of the read data from the FIFO means to the buffer memory.

The FIFO means comprises: dummy data generating means for causing the re-sync mark detection window expanding means to generate dummy data substituting for the read data; detection failure judging means for generating a detection failure signal when judging the failure of detection of the sync and re-sync marks in response to the supply of the second sync and re-sync mark detection status signals; and selective output means for selectively supplying dummy data and the read out data to an inside memory means in response to whether there is the detection failure signal.

The disc controller further comprises:
frequency dividing means for generating a dummy data transfer timing signal corresponding to the second rate of transfer for every predetermined count of clock signal received by the dummy data transferring means; and dummy data output control means for controlling the output of the dummy data in response to the supply of the detection failure signal and the dummy data transfer timing signal.

According to another aspect of the present invention, there is provided a disc controller comprising a re-sync mark detection window expanding means, in response to a supply of sync and re-sync mark detection failure status signals for data to be written or read for advancing a timing of opening a re-sync mark detection window to be earlier than an instant of generation of the sync or re-sync detection success status signal.

Other objects and features will be clarified from the following description with reference to attached drawings.

DETAILED DESCRIPTION OF THE PREFERRED EMBODIMENT

Figure 1:
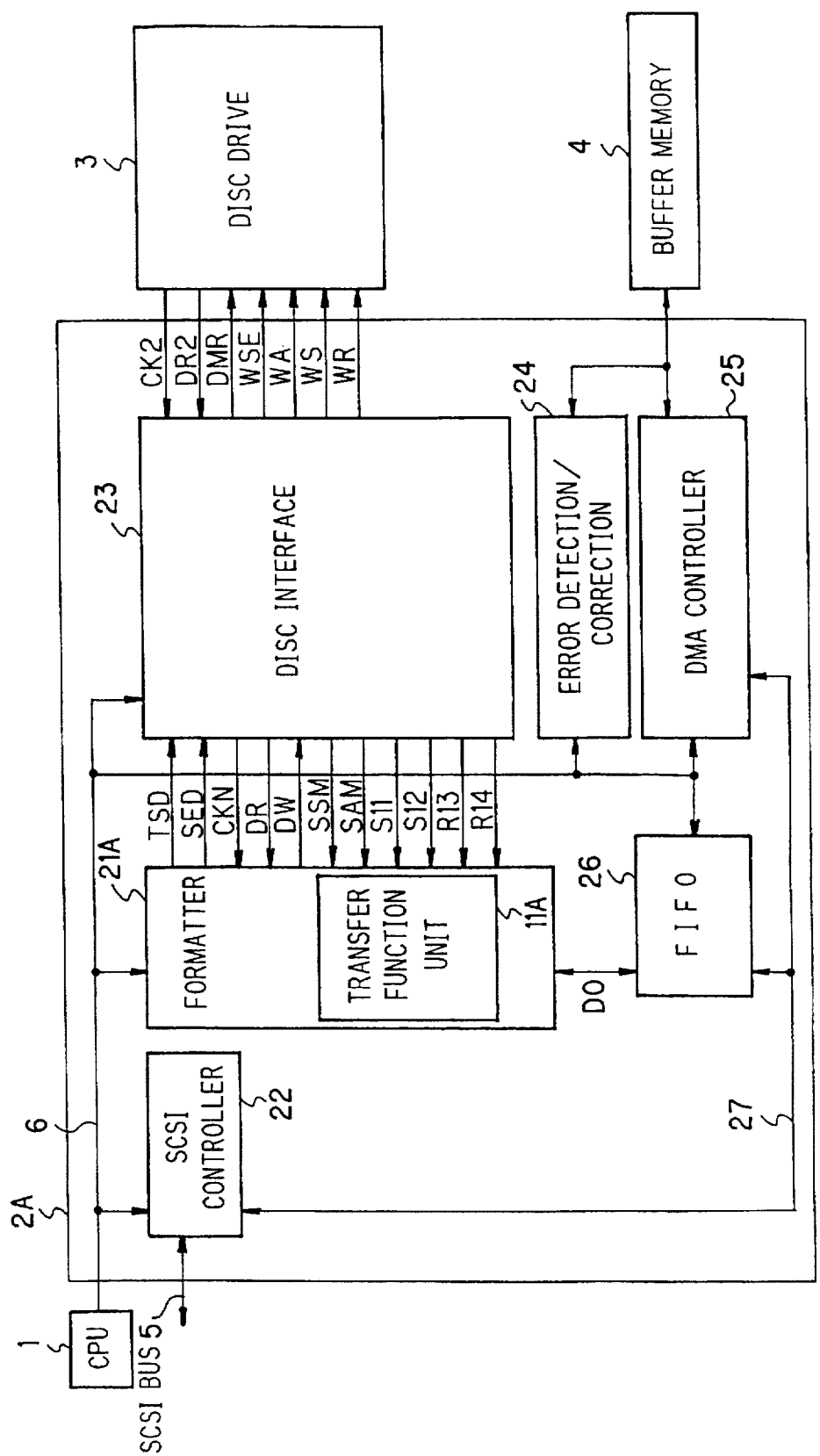
FIG. 1 is a block diagram showing an embodiment of the present invention.

FIG. 1 is a block diagram showing an embodiment of the present invention, constituent elements like those in the prior art example being designated by like reference numerals and symbols. A disc controller 2 comprises, in addition to the SCSI controller 22, disc interface 23, error detecting/correcting unit 24, DMS controller 25 and FIFO 26 as in the prior art structure, a formatter 21A, which replaces the formatter 21 and includes a transfer function section 11A permitting high speed dummy data transfer, a CPU 1 which is connected to the external bus 6 as in the prior art, a disc drive 3, a buffer memory 4 and an SCSI bus 5.

Figure 2:
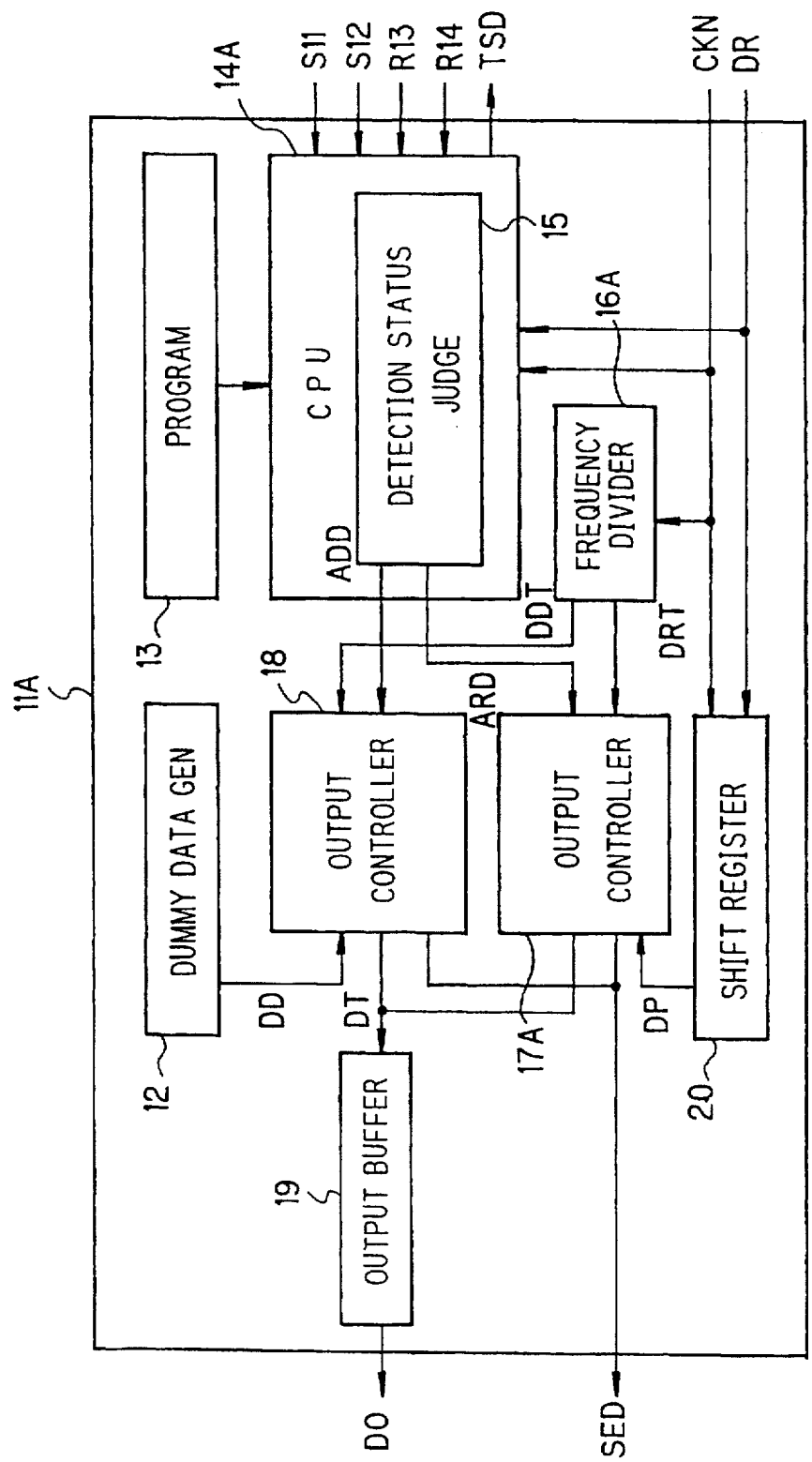
FIG. 2 is a block diagram showing the structure of the function transfer section 11A.

FIG. 2 is a block diagram showing the structure of the transfer function section 11A. The transfer function section 11A comprises, in addition to the dummy data generator 12, output buffer 19 and shift register 20 as in the prior art transfer function section 11, a CPU 14A, which is supplied with sync mark detection success and failure status data S11 and S12 and re-sync mark detection success and failure status data R13 and R14 and recognizes the detection status from the result of detection of these marks, an operation Program 13A of the CPU 14A replacing the program 13, a frequency divider 16A, which replaces the frequency divider 16 and supplies timing signals DDT and DRT for the dummy and read data, respectively, an output controller 17A, which replaces the output controller 17A and outputs parallel data DP in response to supplied read data output permission signal ARD, a dummy data exclusive output controller 18 for outputting dummy data DD in response to the supplied dummy data output permission signal ADD.

The frequency divider 16A frequency divides a clock CKN to generate a read data transfer timing signal DRT for every 8 bits of data as in the prior art and a dummy data transfer timing signal DDT at a frequency of 1/n (n being an integer greater than 1, for instance 2) of that of the timing signal DRT, in this example, generated for every 4 bits of data.

Figure 3:
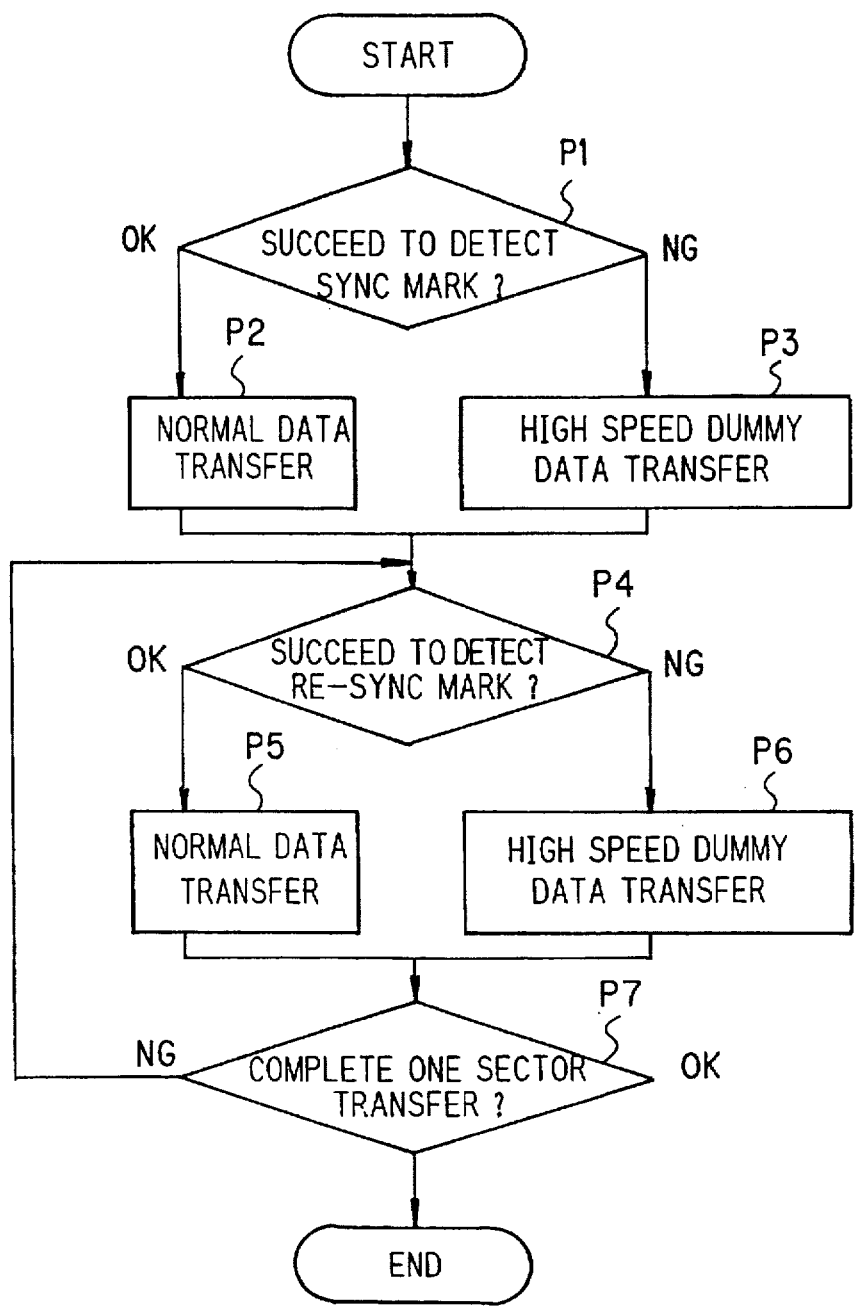
FIG. 3 is a flow chart of the process of the program 13A.

Now, an operation of reading out the data recorded on the disc via the disc drive 3 in this embodiment, will be described with reference to FIGS. 1 and 2 and FIG. 3 showing the flow chart of the process of the program 13A.

First, as in the prior art, when the CPU 1 detects the reception of a read operation command by the SCSI controller 22, it sets parameters such as the read target truck and sector No. and number of process sectors in the respective registers of the formatter 21A, DMA controller 25, disc interface 23, error detecting/correcting unit 24 and the FIFO 26 and starts the disc controller 2A. In the transfer function section 11A of the formatter 21A, the CPU 14A executes the operation according to the program 13A, and the detection status judging unit 15 makes the read data output permission signal ARD active and supplies it to the output controller 17A in response to the generation of the sync mark detection success status data S11.

In response to the input of the read data output permission signal ARD, the output controller 17A outputs the parallel data DP, supplied from the shift register 20 for each timing signal DRT supplied from the frequency divider 16A, as transfer data DT to the output buffer 19, the transfer data DT being supplied as output data DO of the formatter 21A from the output buffer 19 to the FIFO 26.

When the data DO having number of bytes of data between the sync and re-sync marks is transferred from the formatter 21A to the FIFO 26, data transfer end status data SED is supplied to the disc interface 23. In response to the data transfer end status data SED, the disc interface 23 opens the re-sync mark detection window WR and executes the re-sync mark detection. When it succeeds in the re-sync mark detection, the re-sync mark detection success status data R13 is supplied to the formatter 21A. In response to the re-sync mark detection success status data R13, the formatter 21A executes the transfer of data input subsequent to the re-sync mark like the above transfer of data corresponding to the sync mark, and repeats the re-sync mark detection and data transfer until completion of transfer of one sector of data.

The operation with the program 13A will now be described with reference to FIG. 3, which is the flow chart of the program 13A with processes like those in the prior art shown by like reference numerals and symbols. First, a check is made in a step P1 as to whether it has been succeeded to detect the sync mark. If succeeded, a step P2 of normal data transfer is executed. If failed, a step S3 is executed to high speed dummy data transfer in a process to be described later. In a subsequent step P4, a check is made as to whether it has been succeeded to detect re-sync mark. If succeeded, a step P5 of normal data transfer is executed. If failed, a step S6 of high speed dummy data transfer is executed. In a subsequent step P7, a check is made as to whether transfer of one sector data has been completed. If it has not, the program returns to the step P4. If it has, an end is brought to the program. The steps P1, P2, P4, P5 and P7 are like the prior art processes.

Figure 4:
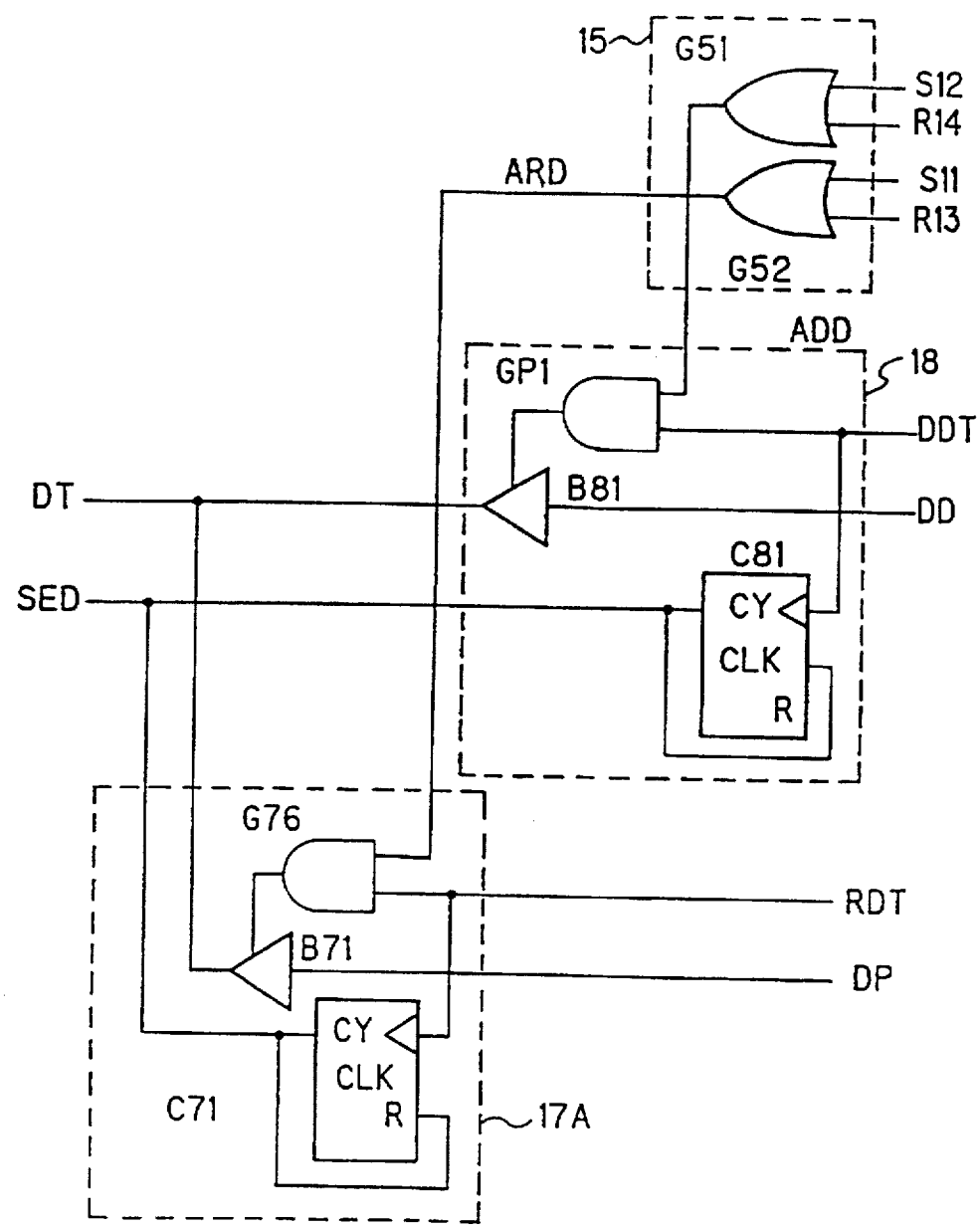
FIG. 4 is a circuit structure of the detection status judging section 15 and output controllers 17A and 18 in the transfer function section 11A.

FIG. 4 shows the circuit structure of the detection status judging section 15 and output controllers 17A and 18 in the transfer function section 11A. The detection status judging section 15 has an OR gate G51 which is supplied with the sync and re-sync mark detection failure status data S12 and R14 to generate the dummy data output permission signal ADD, and an OR gate G51 which is supplied with the sync and re-sync mark detection success status data S11 and R13 to generate the read data read data output permission signal ARD. The output controller 17A has an AND gate G76 which is supplied with the read data output permission signal ARD and read data transfer timing signal RDT, a gated buffer B71 for outputting parallel data DP received in response to the supply of the output of the AND gate G76, and a counter C71 for counting the read data transfer timing signal DRT to generate the data transfer end status data SED.

The output controller 18 has an AND gate G81 which is supplied with the dummy data output permission signal ADD and dummy data transfer timing signal DDT. A gated buffer B81 for outputting dummy data DD received in response to the supply of the output of the AND gate G81, and a counter C81 for counting timing signal DDT to generate the data transfer end status data SED.

The transfer function section 11A in this embodiment is different from the transfer function section 11 in the prior art in that instead of the prior art output controller 17 which is common to both the read and dummy data the output controllers 17A and 18 which are exclusive to the read and dummy data, respectively, and that the timing signals DRT and DDT are generated independently for the read and dummy data transfer for controlling the output controllers 17A and 18.

In operation, as in the prior art, the sync and re-sync detection failure status data S12 and R14 are input to the OR gate G51, and the sync and re-sync mark detection success status data S11 and R13 to the OR gate G52. The sync and re-sync mark detection result status is judged from the outputs of the OR gates G51 and G52. In case of the success of detection, the read data permission signal ARD is made active to output the parallel data DP. In case of the failure of detection, the dummy data permission signal ADD is made active to output the dummy data DD.

Figure 5:
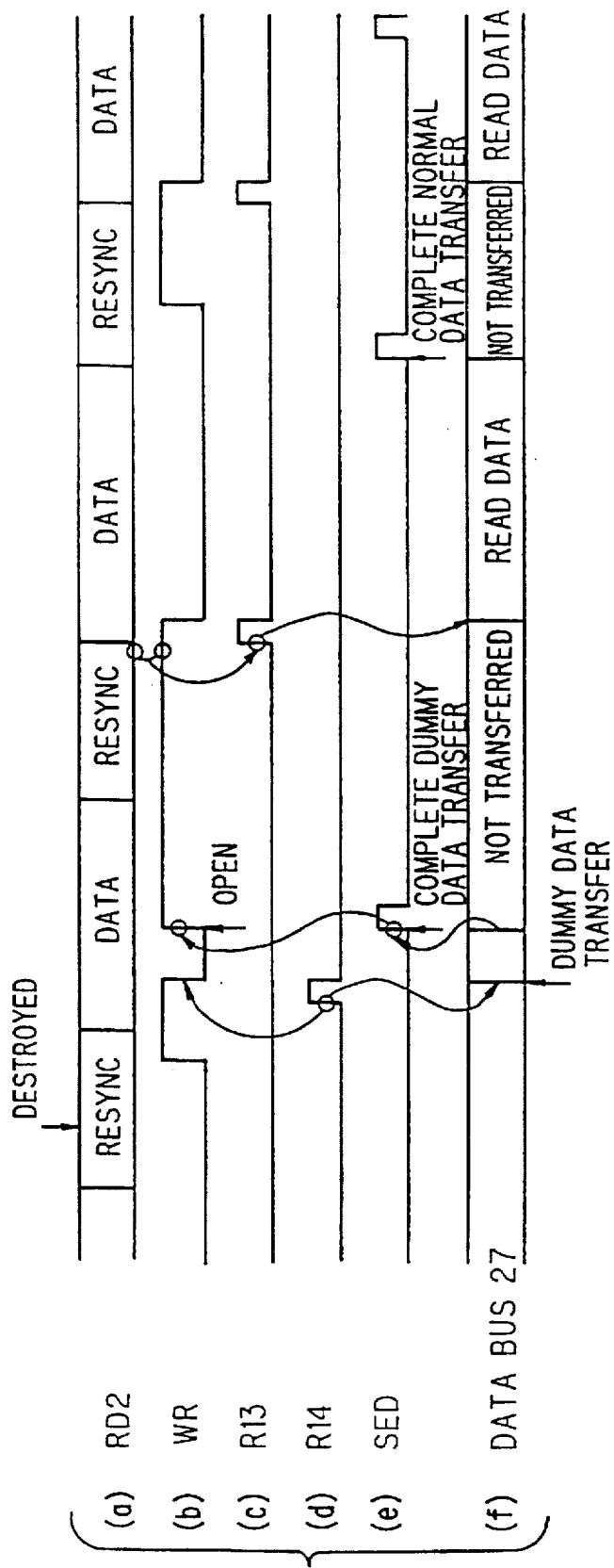
FIG. 5 is a flow chart of operation in the case of the re-sync mark detection failure.

FIG. 5 is a flow chart of operation in the case of the re-sync mark detection failure. As in the prior art, in the operation of reading out data from the disc drive 3, in the event of re-sync mark detection failure after the formatter 21A has detected a target sector and output target sector detection status data TSD, the disc interface 23 outputs re-sync mark detection failure status data R14 at the end of the re-sync mark detection window WR, as shown in (d). When the CPU 14A conforms the generation of this re-sync mark detection failure status data R14, the detection status judging section 15 executes the program 3A by using a high speed dummy data transfer command thereof, thus making the dummy data output permission signal ADD active and then supplying it to the output controller 18. In response to the activation of the dummy data output permission signal ADD, the output controller 18 outputs the dummy data DD, which is output from the dummy data generator 12, to the output buffer 19 every time dummy data transfer timing signal DDT from the frequency divider 16A is input. As described above, the timing signal DDT is supplied for every 1/n, i.e., ½ here, of the frequency of the read data transfer timing signal DRT for every 8 bits, i.e., for every 4 bits of data. Thus, at the time of the re-sync mark detection failure the dummy data DD can be transferred at n, i.e., 2 here, times the speed at the time of the success. That is, the data transfer end status data SED is output at the end timing of the dummy data DD transfer corresponding to the predetermined number of bytes between two successive re-sync marks. Thus, reduction of the dummy data transfer time is realized, and the data transfer function 11A can output the data transfer end status data SED to the disc interface 23 at an early timing compared to the prior art data transfer function 11, whereby the re-sync mark detection window WR is opened at an early timing. As a result, it is possible to reliably detect re-sync marks from the read data RD.

In the case of the sync mark detection failure as well, using the data transfer function 11A of this embodiment it becomes possible to open the re-sync mark detection window WR earlier than in the prior art as shown in (b) in FIG. 5. Thus, it is possible to improve the re-sync mark detection possibility and permit reliable reading of the data recorded in the sector. Further, by using the function of the error detecting/correcting unit 24 in combination it is possible to obtain restoration of the data train with dummy data set therein for sync mark detection failure. The upper limit of the frequency division ratio n of the timing signal DDT used at the time of the dummy data transfer, is restricted by the speed of data transfer from the FIFO 26 to the buffer memory 4 under control of the DMA controller 25 and the quantity of data that can be preserved in the FIFO 26 (i.e., the number of stages of the FIFO 26).

Figure 6:
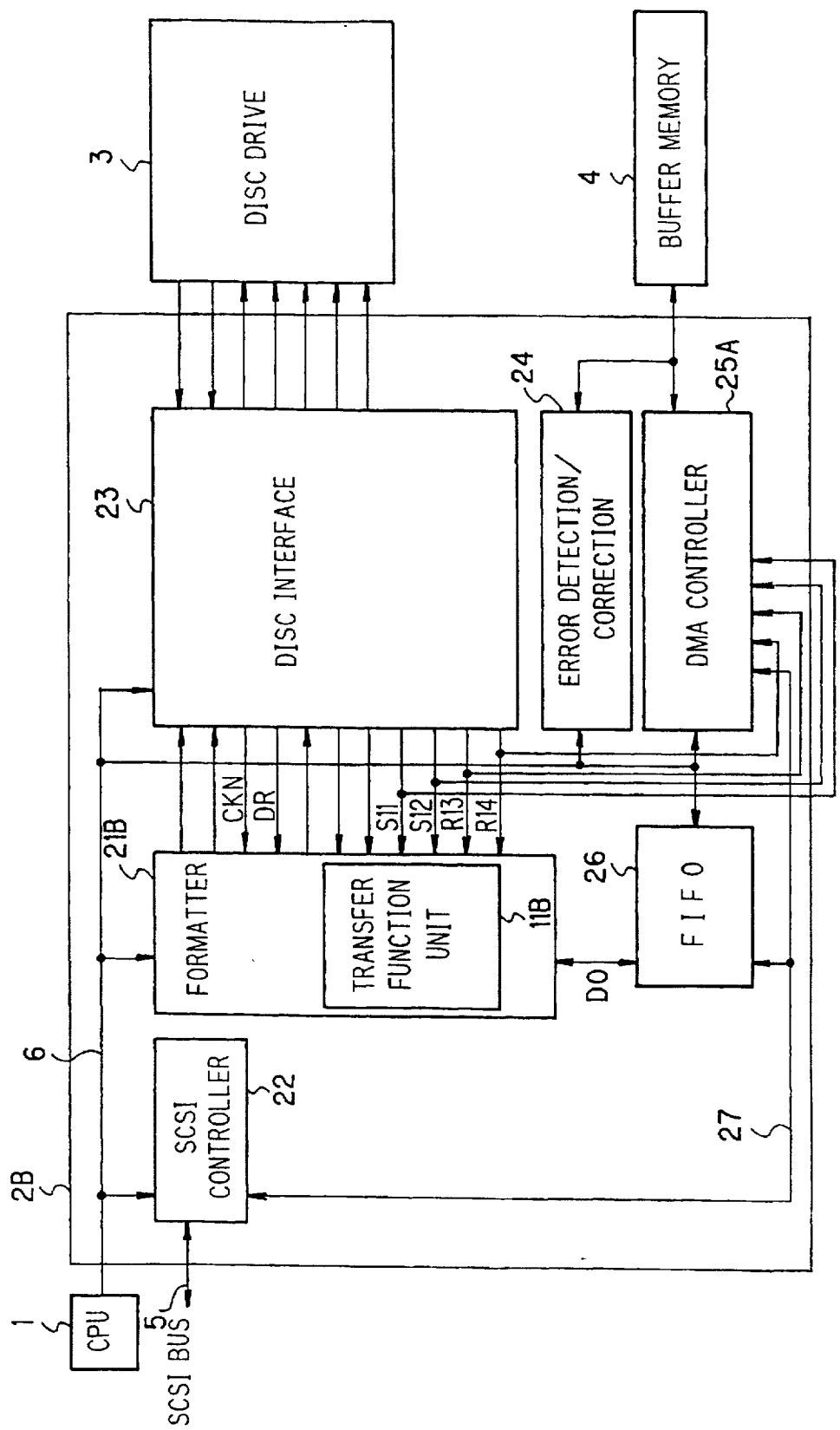
FIG. 6 is a block diagram showing a second embodiment of the invention.

FIG. 6 is a block diagram showing a second embodiment of the invention with constituent elements like those in FIG. 1 designated by like reference numerals and symbols. The disc controller 2B in this embodiment is different from the disc controller 2A in the first embodiment as follows. In lieu of the formatter 11A is used a formatter 21B which includes a transfer function section 11B having a lead data exclusive output controller 17A, and in lieu of the DMA controller 25 is used a DMA controller 25A which causes transfer only normal data to addresses of the buffer memory 4 taking the sector format into account and does not transfer any dummy data from the FIFO 26 to the buffer memory 4. More specifically, the present invention pays attention to the following two considerations in the first embodiment in which the dummy data DD transferred by the formatter 21A is eventually re-written by the error detecting/correcting unit 24 into normal data, and normal error detection and correction are executed so long as the normal data is present in the corresponding addresses on the disc format. Whereas in the first embodiment the formatter 21A executes the dummy data transfer to the buffer memory 4 via the DMA controller 25, the formatter 21B in this embodiment transfers only the normal data, thus permitting reduction of the burden on the disc controller 2B.

Figure 7:
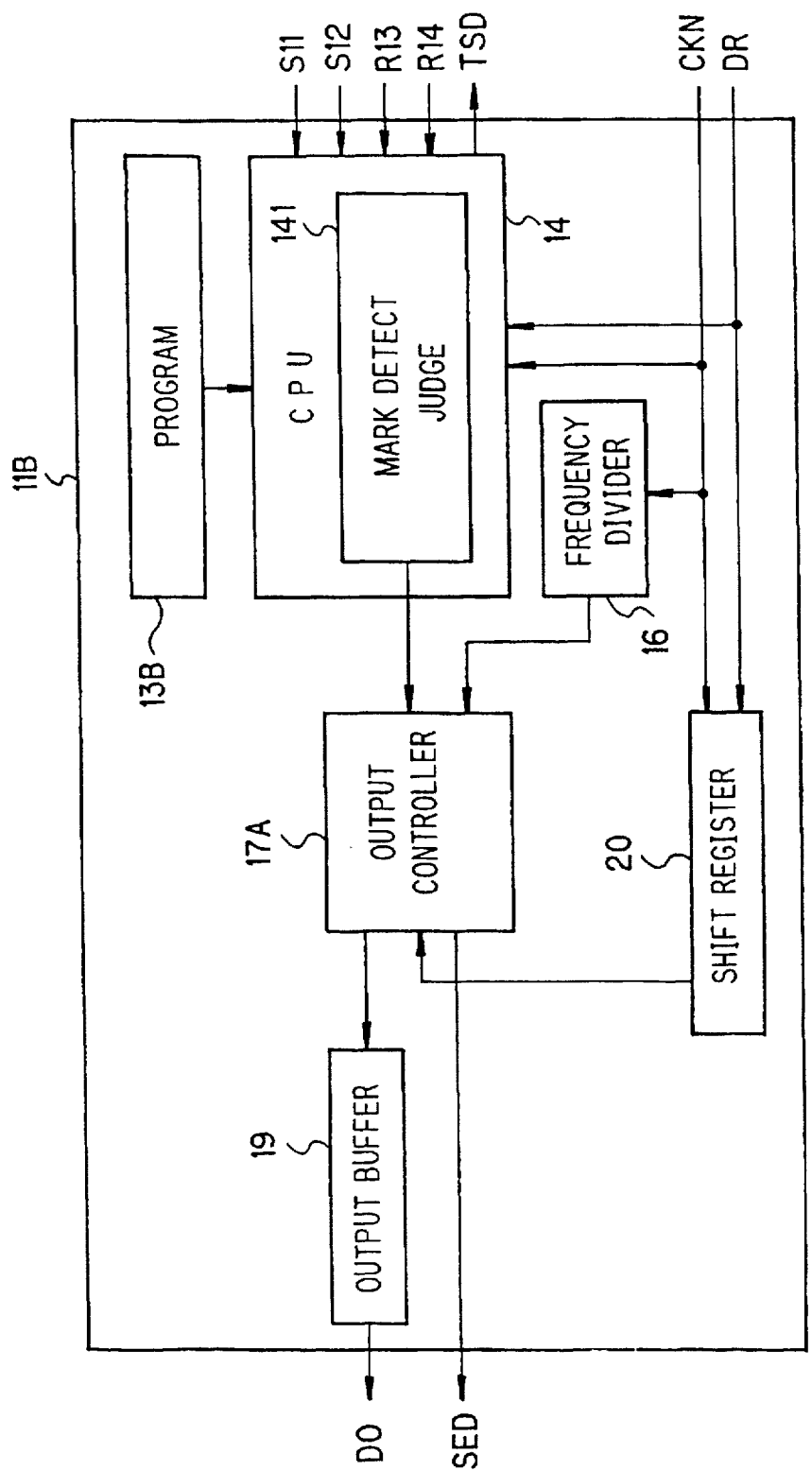
FIG. 7 is a block diagram showing the structure of the transfer function section 11B.

FIG. 7 is a block diagram showing the structure of the transfer function section 11B. The transfer function section 11B includes a CPU 14 having a mark detection judging section 141 like that in the prior art, a frequency divider 16, an output controller 17A like that in the first embodiment, an output buffer 19 like that in the prior art and also in the first embodiment, a shift register 20, and a program 13B replacing the programs 13 and 13A.

Figure 8:
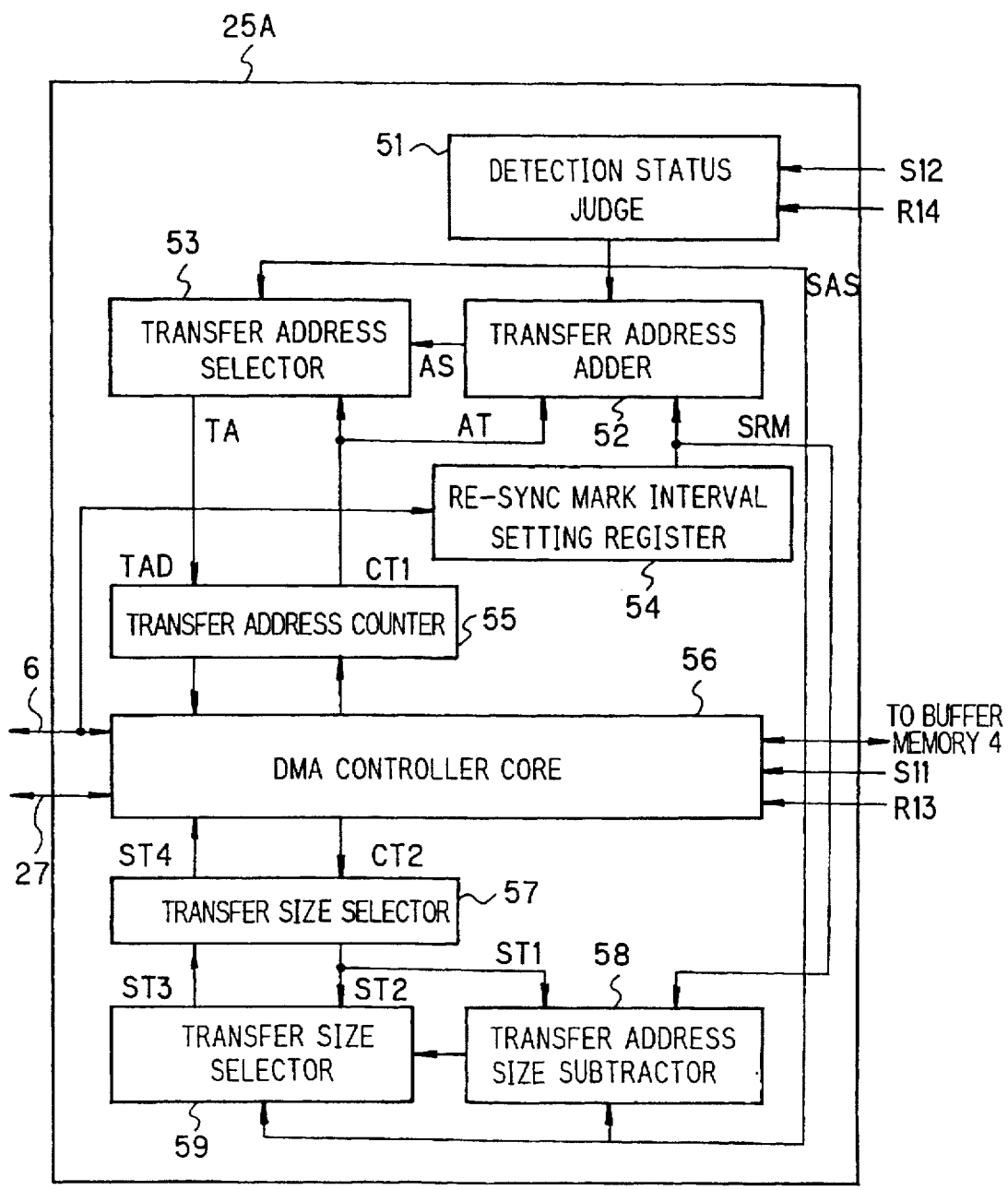
FIG. 8 is a block diagram showing the structure of the DMA controller 25A.

FIG. 8 is a block diagram showing the structure of the DMA controller 25A. The DMA controller 25A, as shown, includes a detection status judging section 51, similar to the detection status judging section 15 in the first embodiment, determines the sync/re-sync mark detection failure in response to the supply of sync and re-sync mark detection failure status data S12 and R14 and outputs a transfer address size selection/arithmetic operation signal SAS indicative of transfer address size selection and necessary arithmetic operation, a transfer address adder 52 for executing a predetermined addition with respect to the transfer address in response to the transfer address size selection/ arithmetic operation signal SAS, a transfer address selector 53 for selecting transfer address in response to the signal SAS, a re-sync mark interval setting register 54, in which the number of bytes corresponding to the re-sync mark interval is set as a predetermined value SRM, a transfer address counter 55, a DMA controller core section 56 serving as the DMA controller body, a transfer address size counter 57, a transfer address size subtractor 58, and a transfer address size selector 59.

Figure 9:
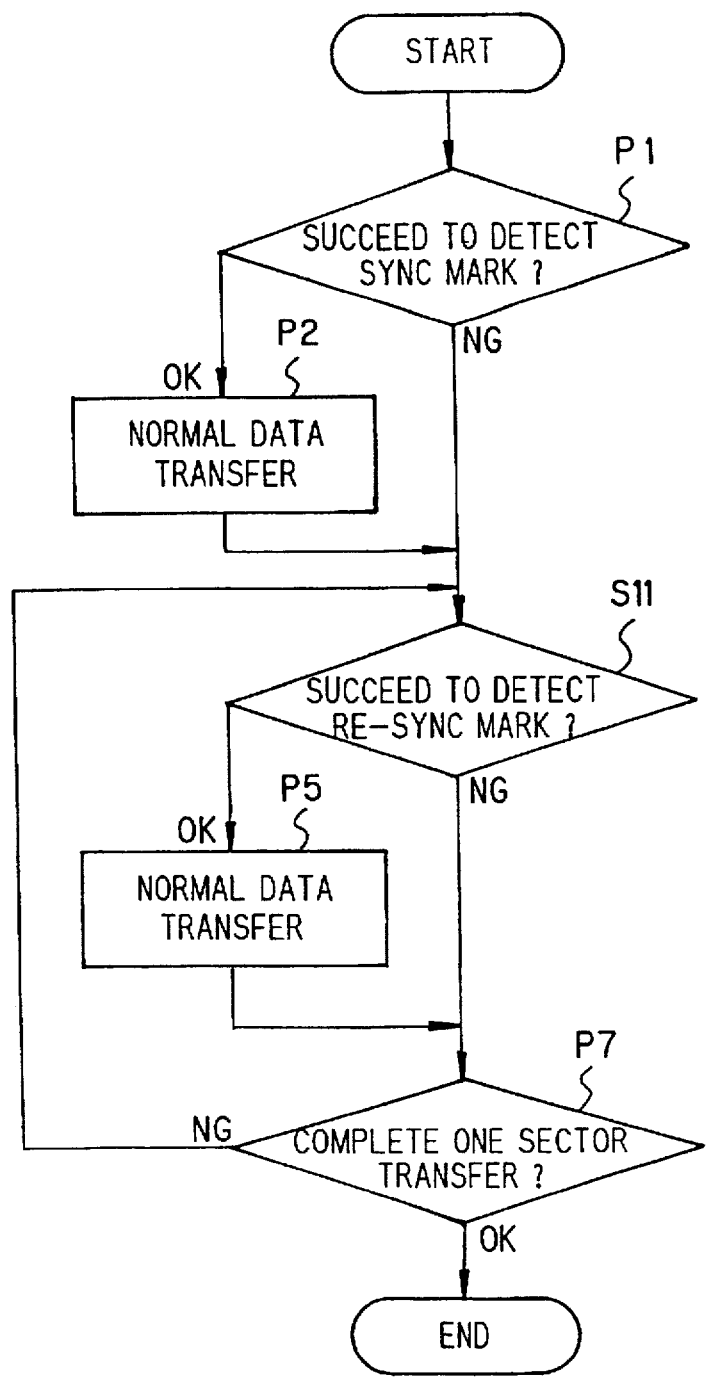
FIG. 9 is a flow chart showing the operation with the program 13B.

FIG. 9 is a flow chart showing the operation with the program 13B with processes like those in the prior art and also in the first embodiment designated by like reference numerals and symbols. The operation with the processes 13B is executed as follows. First, a check in a step P1 is made as to whether there has been a success in sync mark detection. If there has been a success in sync mark detection, a step P2 of normal data transfer is executed. Otherwise, a step S11 is executed, in which a check is made as to whether there has been a re-sync mark detection success. If there has been a success in re-sync mark detection, a step P5 of normal data transfer is executed. Otherwise, a step P7 is executed, in which a check is made as to whether transfer of one sector data has been ended. If the data transfer has not been ended, the program returns to the step P4. If ended, an end is brought to the program. The steps P1, P2, P5 and P7 are like those in the prior art and also in the first embodiment.

Figure 10:
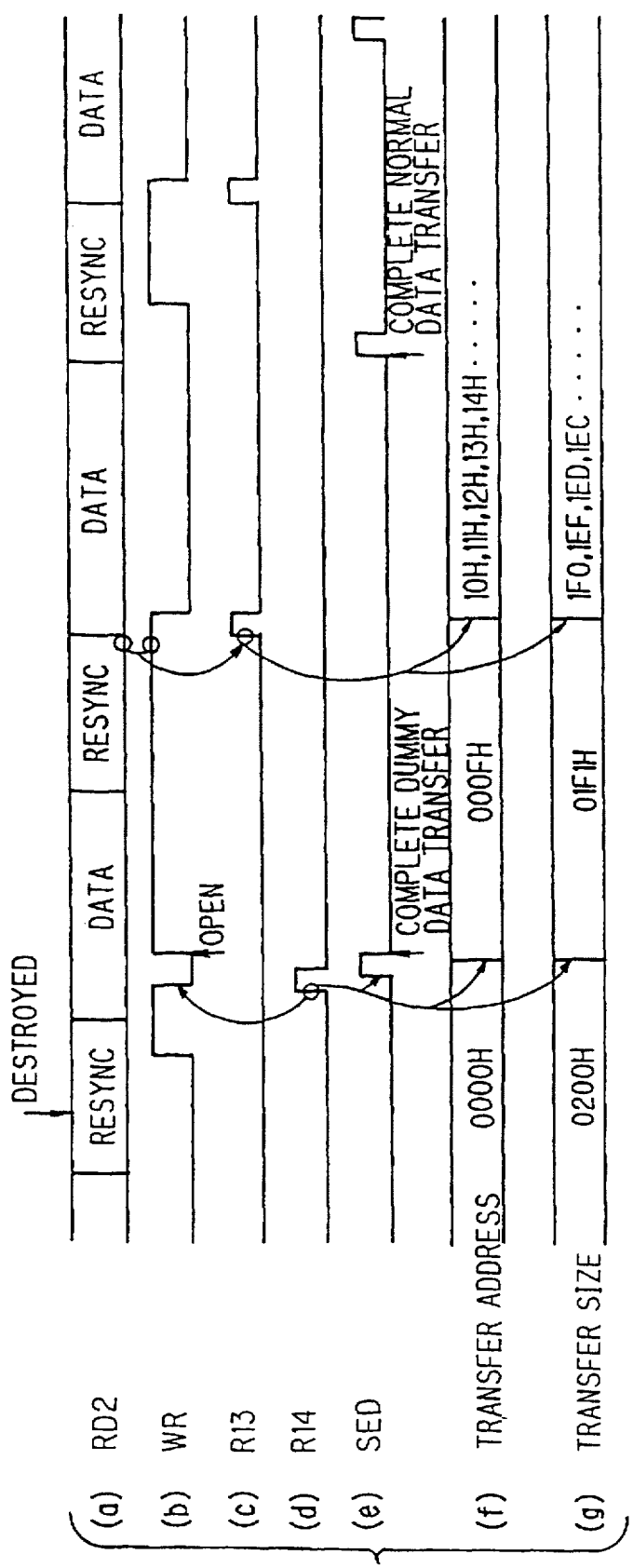
FIG. 10 is a flow chart showing the operation of this embodiment.

The operation of this embodiment will now be described with reference to FIGS. 6 to 9 and the operation timing chart of FIG. 10. Like the first embodiment, in the event of failure of sync or re-sync mark detection, the disc interface 23 supplies sync or re-sync mark detection failure status data S12 or R14 to the formatter 21B and DMA controller 25A when the CPU 14 in the transfer function section 11B in the formatter 21B detects that the re-sync mark detection failure status data R14 is active according to the program 13A, it outputs the data transfer end status data SED without execution of the dummy data transfer, as shown in (e), and waits the generation of the re-sync mark detection success status R13 from the disc interface 23. Further, in the case of the re-sync mark detection success, the formatter 21B operates as in the first embodiment.

Meanwhile, when the detection status judging section 51 detects the generation of the sync or re-sync mark detection failure status data S12/R14, the DMA controller 25A makes the transfer address size selection/arithmetic operation signal SAS active and supplies this active signal to the transfer address adder 52, transfer address selector 53, transfer address size subtractor 58 and transfer address size selector 59. When the received transfer address size selection/ arithmetic operation signal SAS becomes active, the transfer address adder 52 outputs to the transfer address selector 53 sum address data AS. This sum address data AS is the sum of the count value CV of the transfer address counter 55 using a count timing signal CT1 from the DMA controller core section 56, and a setting value SRM of the re-sync mark interval setting register 59, in which the number of bytes corresponding to the interval between two successive re-sync marks has been set. When the signal SAS is inactive, the transfer address selector 53 outputs the count CV as transfer address TA. When the signal SAS is active, the sum address data AS is output as transfer address TA to the transfer address counter 55.

When the signal SAS becomes active, the transfer size subtractor 58 outputs to the transfer address size selector 59 transfer address size data ST2 as a result of the subtraction of the setting value SRM from transfer address size data ST1 output from the DMA controller core section 56 using timing signal CT2. The transfer address size selector 59 selectively outputs transfer address size ST1 when the signal SAS is inactive and transfer address size ST2 when the signal SAS is active, the output transfer address size data being supplied to the transfer address size counter 57.

When either of the sync and re-sync mark detection success status data S11 and R13 is active, the DMA controller core section 56 executes the data transfer from the FIFO 26 to the buffer memory 4 by using transfer address data TAD from the transfer address data counter 55 and transfer address size data ST4 from the transfer address size counter 57. When both the sync and re-sync mark detection success status data S11 and R13 are inactive, the data transfer is not executed, as shown in (c), (d), (f) and (g).

As described above, at the time of success of the next re-sync mark detection, the DMA controller 25A generates destination address of the buffer memory 4 for the transfer of normal data read out from the FIFO 26, thus effecting the transfer of the sole normal data to address of the buffer memory 4 taking the sector format into account. Thus, in this embodiment unnecessary dummy data transfer from the FIFO 26 to the buffer memory 4 is eliminated, thus permitting the generation of the data transfer end status data SED earlier than in the case of the first embodiment, i.e., substantially at the same timing as the generation of the sync/ re-sync mark detection failure status data S12/R14. It is thus possible to permit the re-sync mark detection window WR to be opened more widely.

Further, while there has been described in this embodiment its operation in case when the calculation of transfer address in the DMA controller 25A is set in the direction of addition and the calculation of the transfer address size is set in the direction of subtraction. It is also possible to set the processes of calculation of the transfer address and transfer address size in a combination of either addition or subtraction to obtain the same function.

Figure 11:
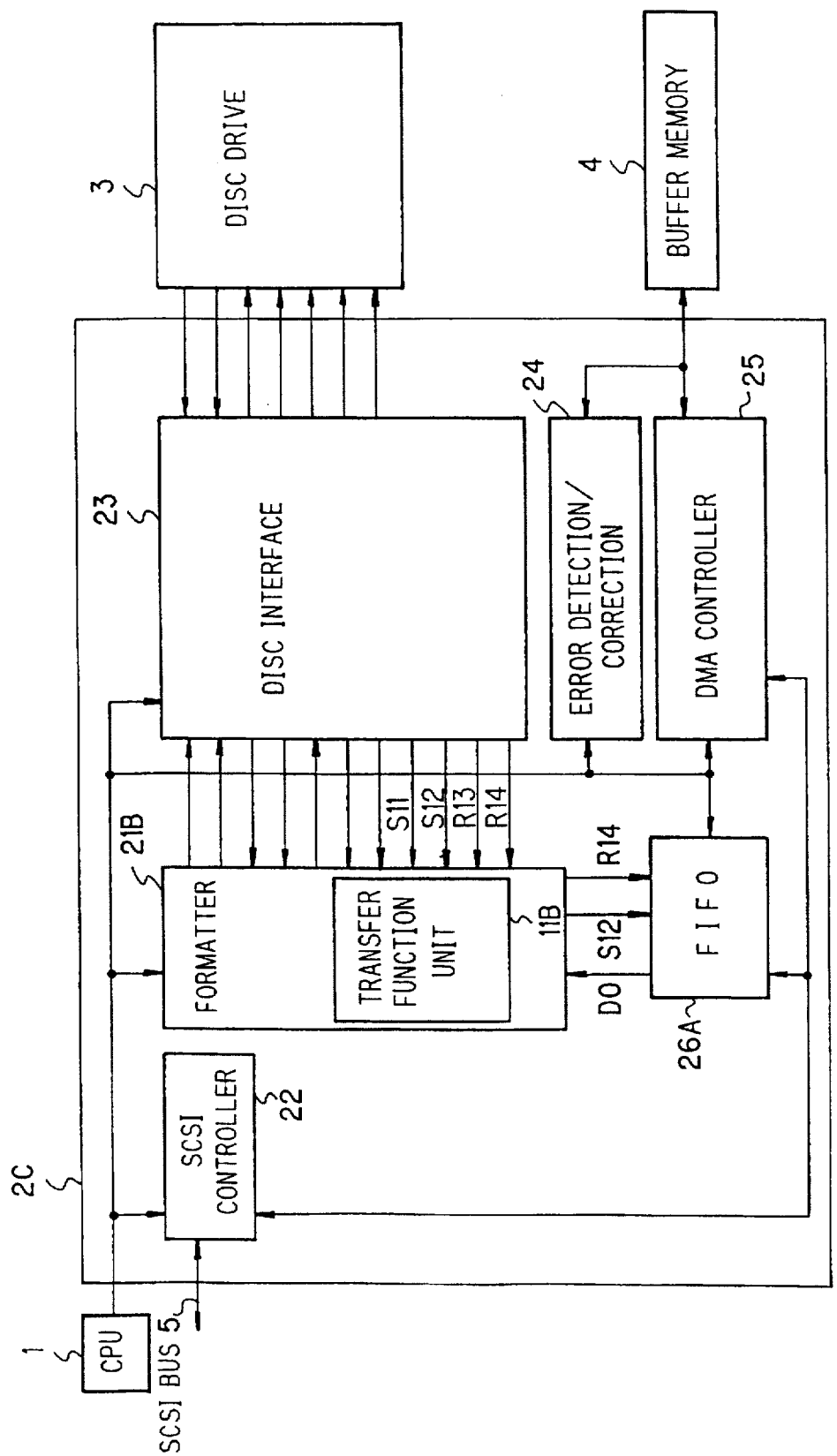
FIG. 11 is a block diagram showing a third embodiment of the invention.

FIG. 11 is a block diagram showing a third embodiment of the invention, with constituent elements like those in the first and second embodiments designated by like reference numerals and symbols. The disc controller 2C of this embodiment is different from the disc controller 2A in the previous first embodiment in that it includes the formatter 21B in lieu of the formatter 11A and FIFO 26A in lieu of the FIFO 26. While in the first embodiment the formatter 21A has been such that the DMA controller 25 executes the dummy data transfer to the buffer memory 4, in this embodiment the FIFO 26A has a dummy data generator 91, and the formatter 21B causes the DMA controller 25 to transfer both the normal and dummy data.

Figure 12:
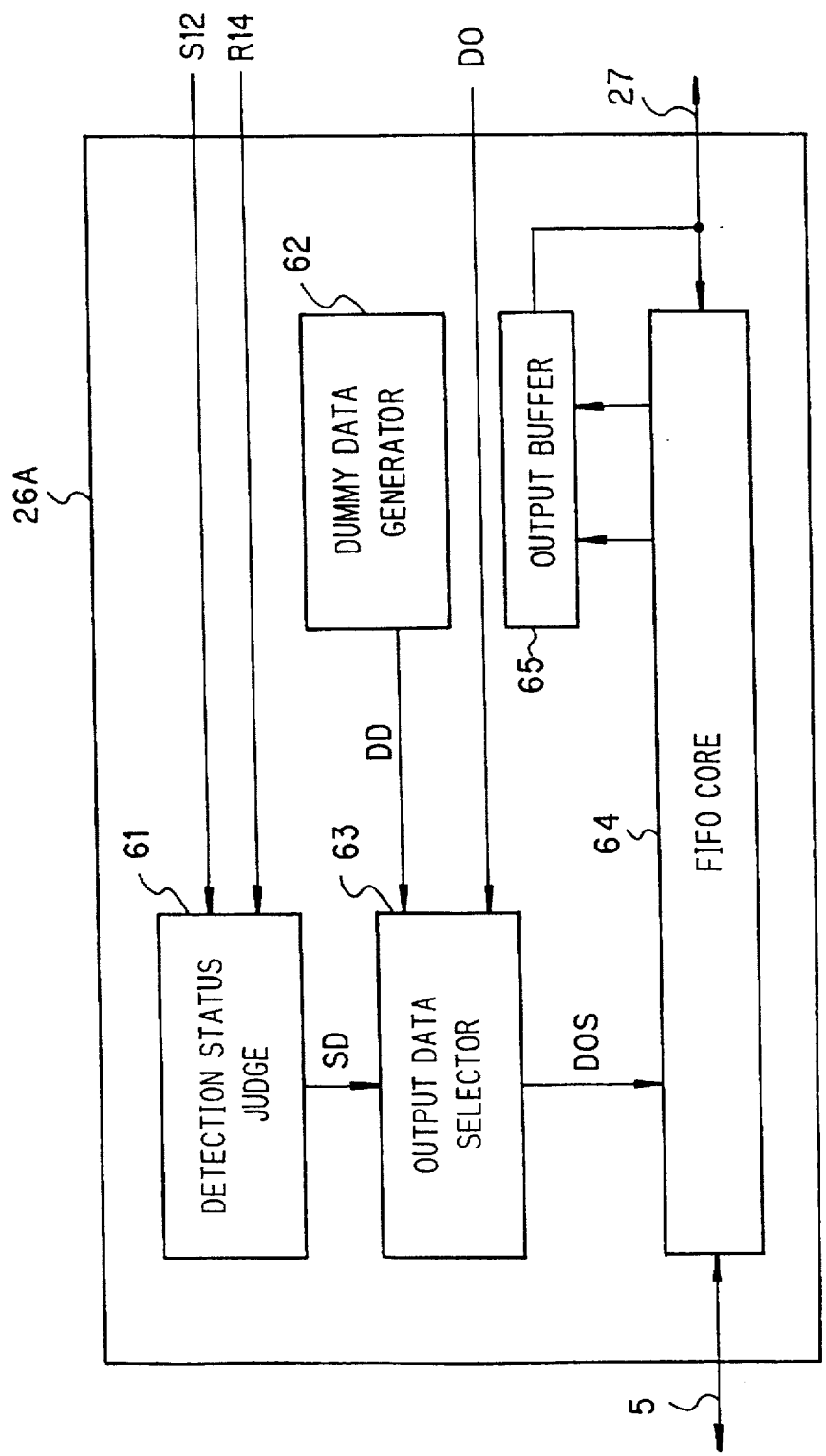
FIG. 12 is a structure of the FIFO 26A.

FIG. 12 shows the structure of the FIFO 26A. The FIFO 26A includes a dummy data generator 62 and a detection status judging section 61, these elements being the similar to the dummy data generator 12 and detection status judging section 15 in the first embodiment, respectively. It further includes an output data selector 63 for outputting either dummy data DD and output data DO as selected data DOS, an FIFO core section 64 as a body of FIFO, and an output buffer 65.

Figure 13:
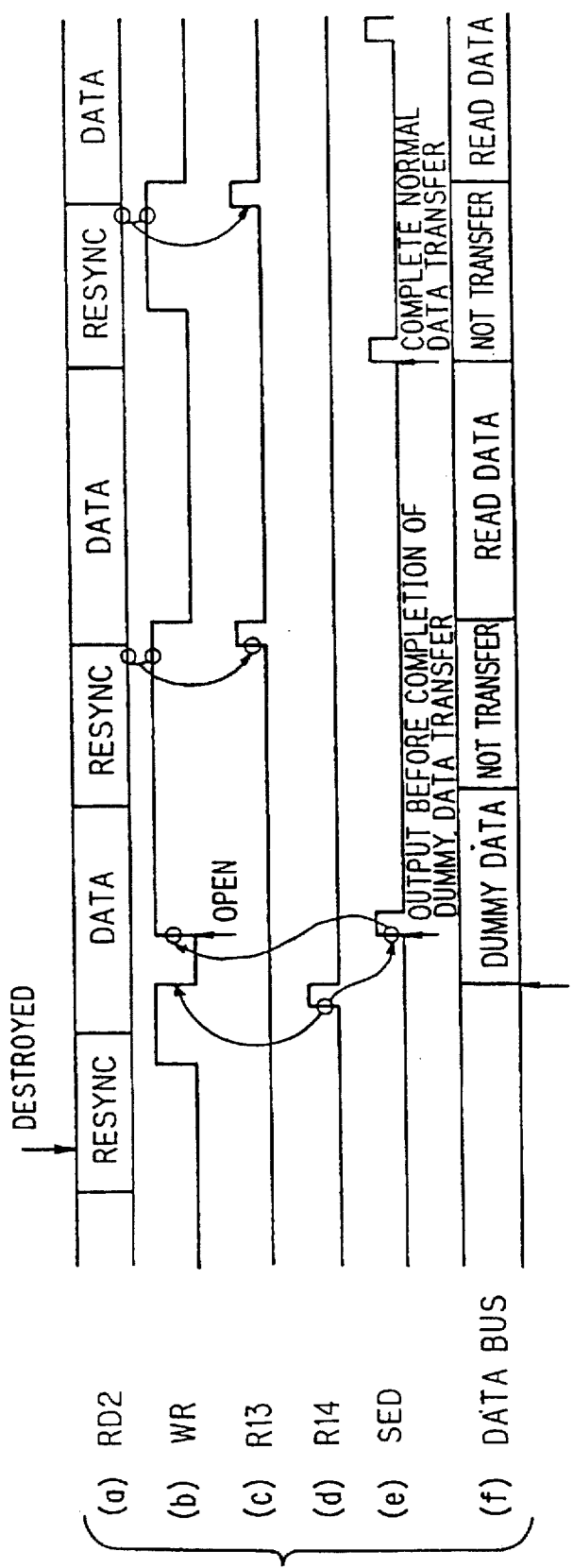
FIG. 13 is an operational time chart of the embodiment.
Figure 14:
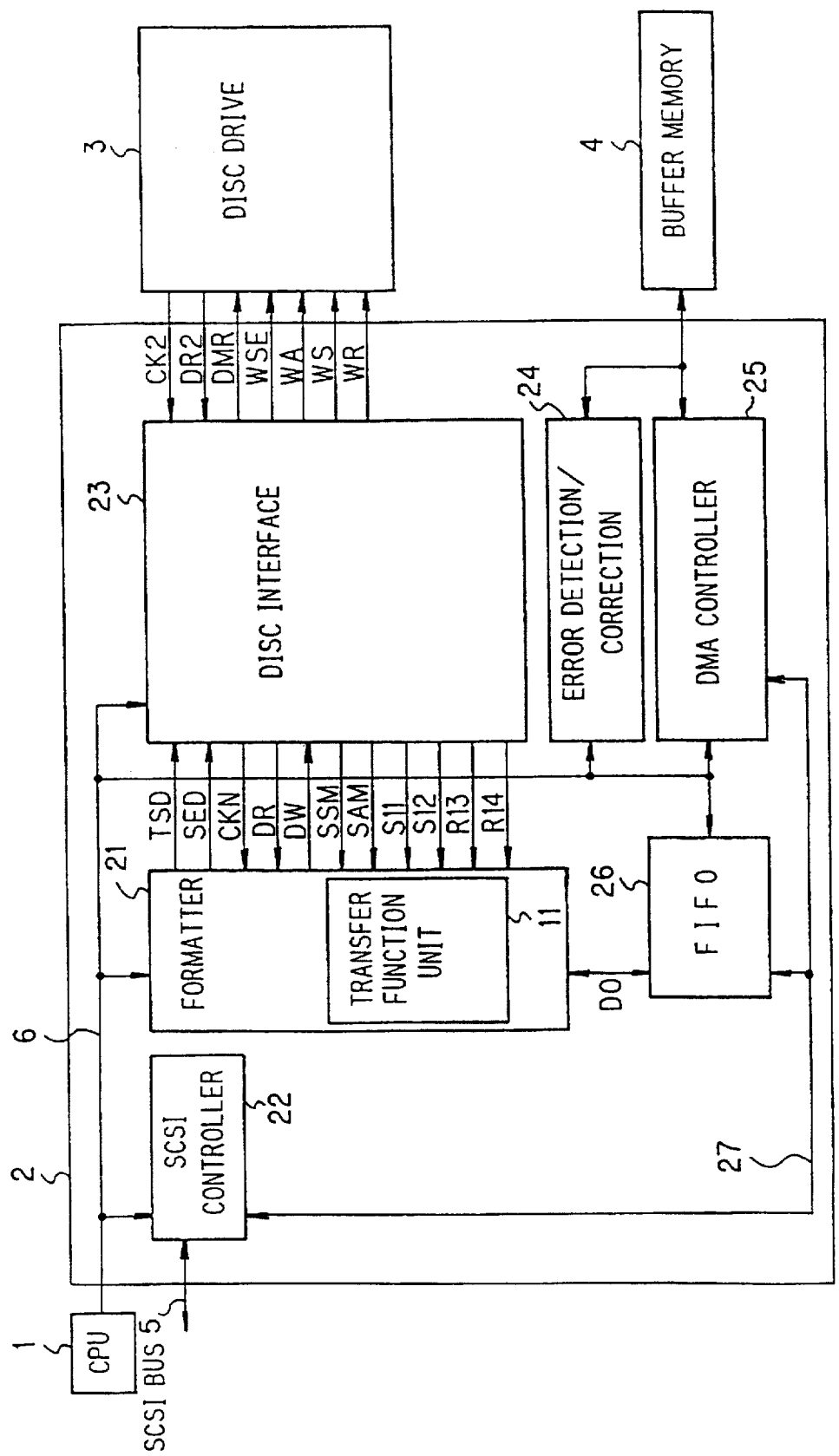
FIG. 14 is a block diagram of the disc controller of a prior art optical magnetic disc apparatus.
Figure 15:
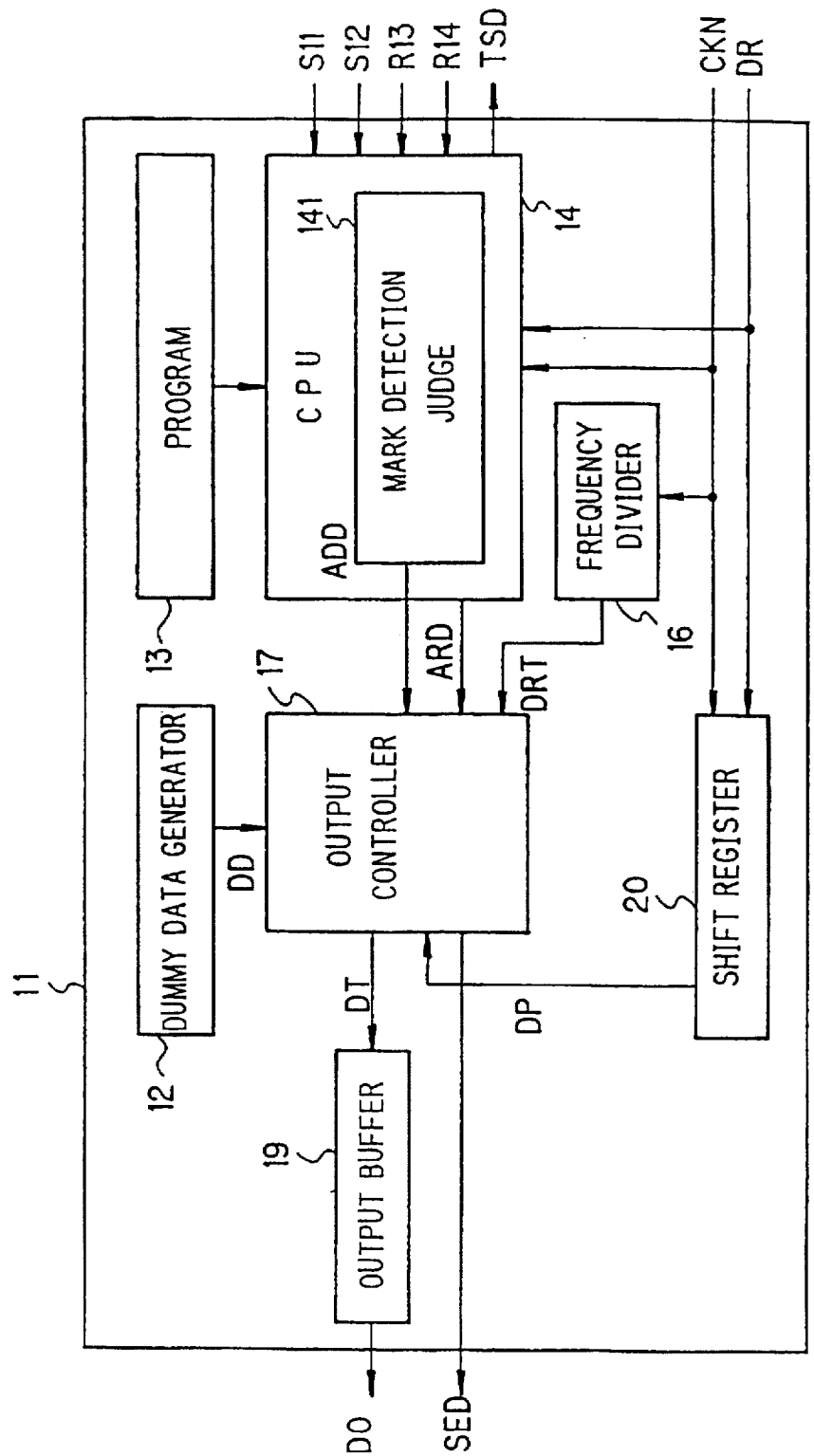
FIG. 15 is a block diagram of the formatter 21.
Figure 16:
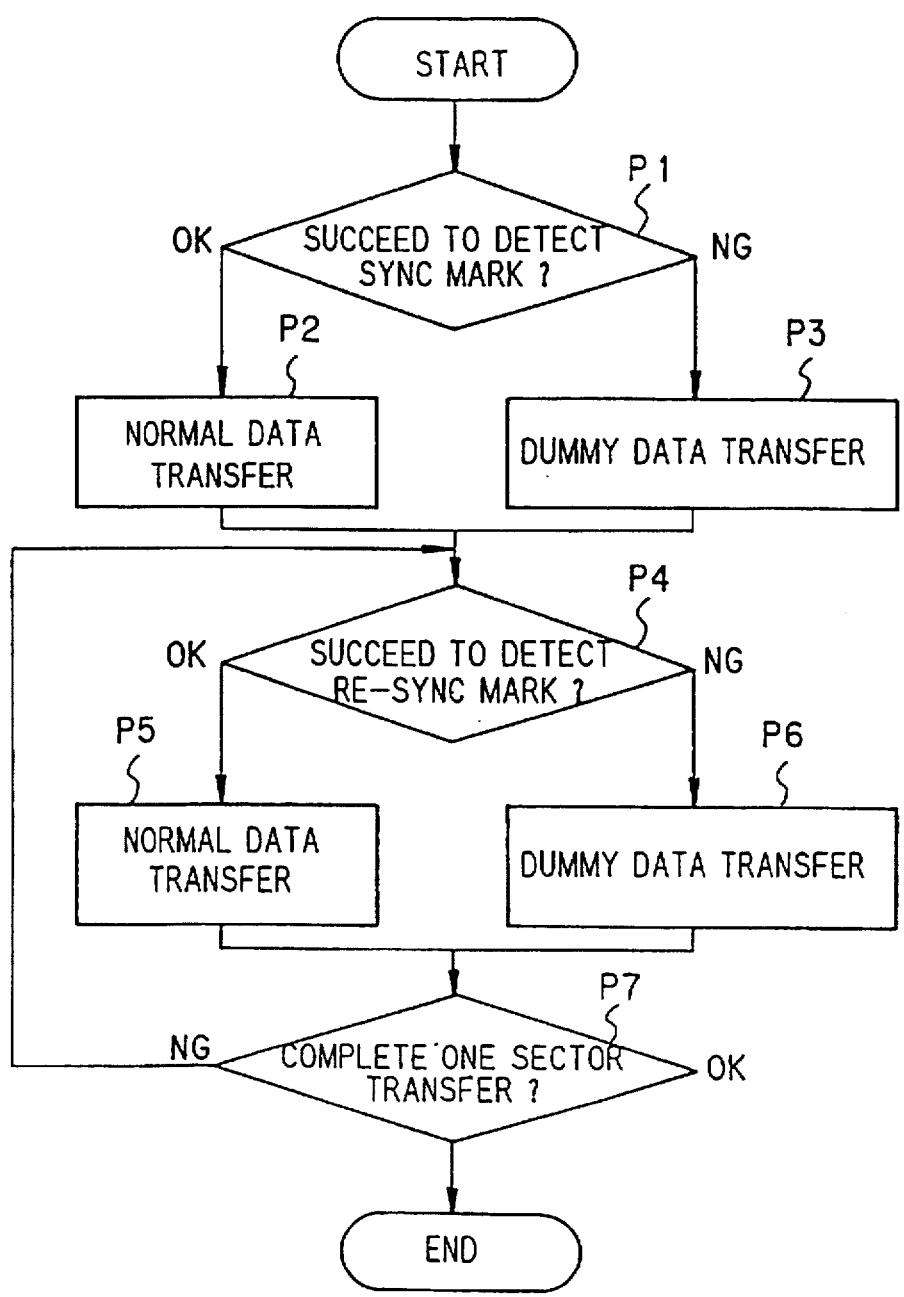
FIG. 16 is a flow chart based on the program 13.
Figure 17:
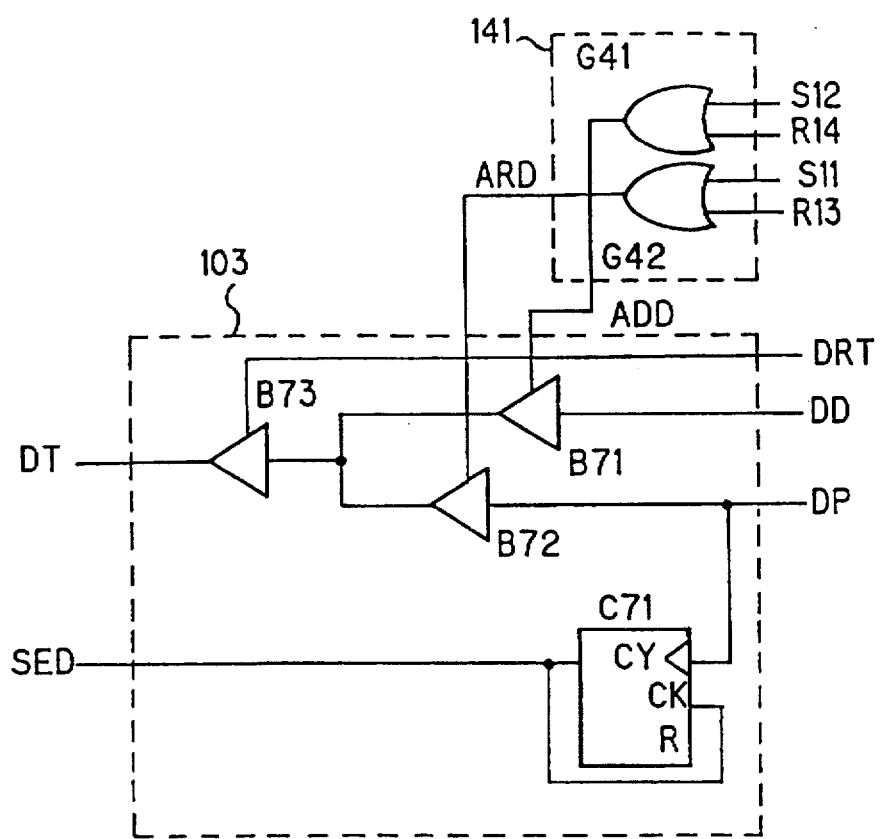
FIG. 17 is a circuit structure of the mark detecting/judging section 141 in the transfer function section 11 and the output controller 17.
Figure 18:
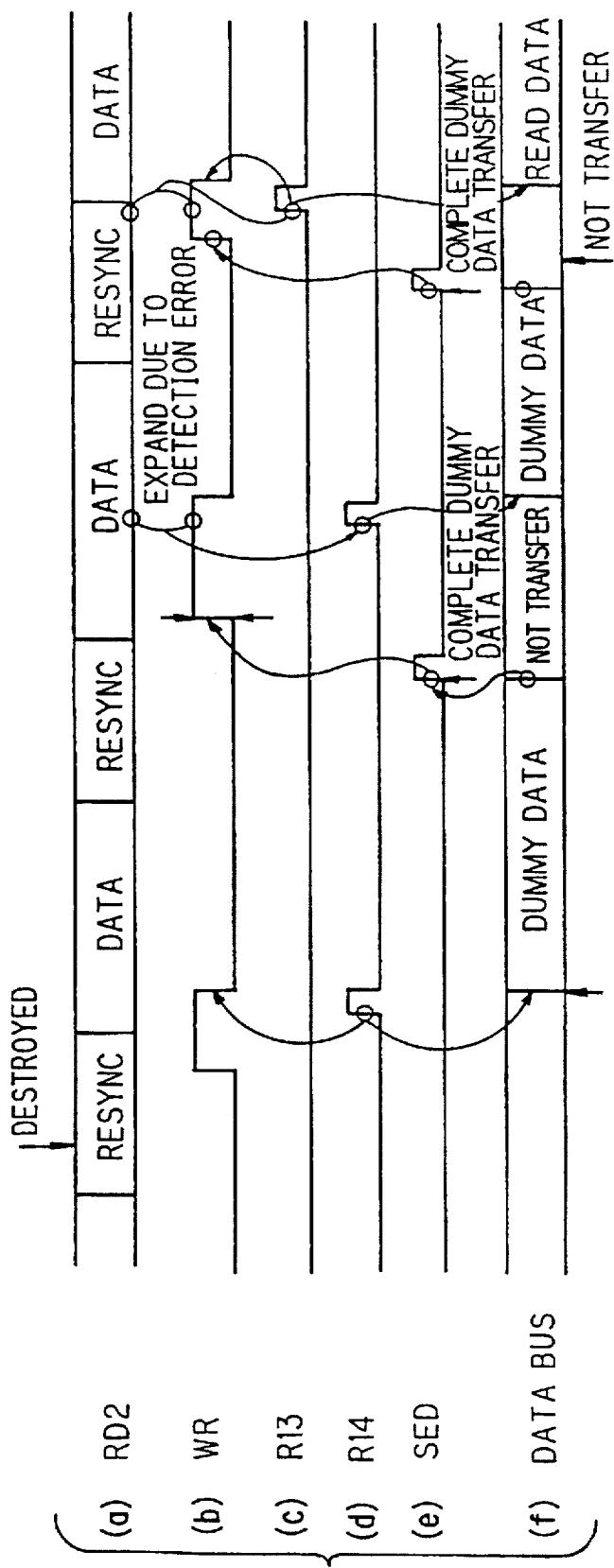
FIG. 18 is a time chart of operation in case of failure in the re-sync mark detection.
Figure 19:
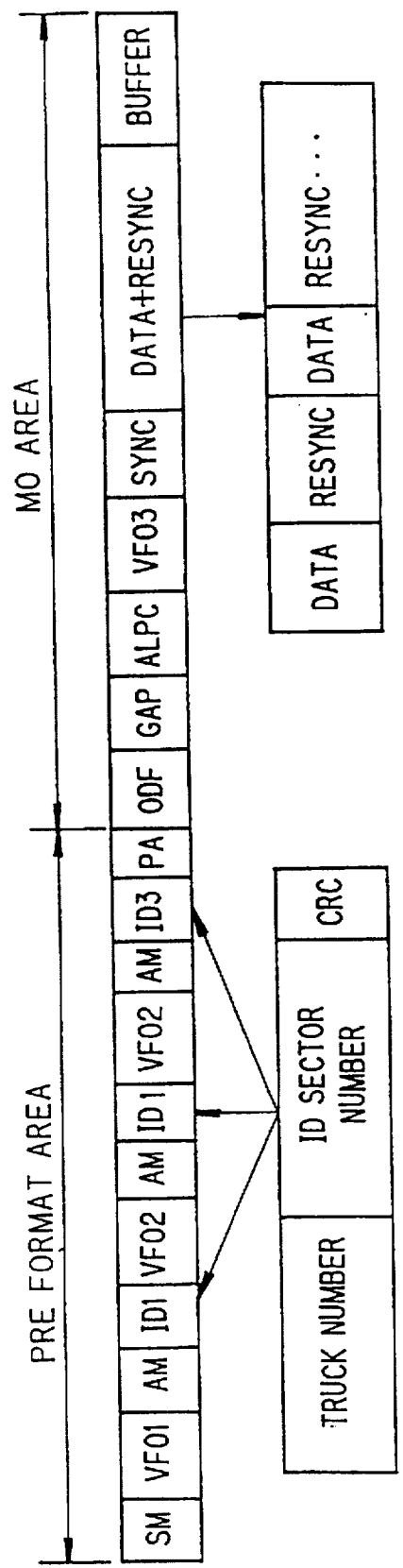
FIG. 19 is an example of the data format of MO disc defined by IOS Standard.

The operation of this embodiment will now be described with reference to FIGS. 11 and 12 and also to the operational time chart of FIG. 13. First, at the time of the failure of sync or re-sync mark detection, the disc interface 23 outputs the sync or re-sync mark detection failure status data S12 and R14 to the formatter 21B and FIFO 26A. At this time, the formatter 21B does not send out any dummy data but makes the data transfer end status data SED active and supplies the same to the disc interface 23 to let the disc interface 23 wait for the next re-sync mark detection success status data R13.

Meanwhile, as for the FIFO 26A, the dummy data generator 62 generates dummy data DD corresponding to the number of bytes of data between sync and succeeding re-sync marks, i.e., the number of bytes of data between two successive re-sync marks and supplies the generated dummy data to the output data selector 63.

When either of the sync and re-sync detection failure status data S12 and R14 becomes active, the detection status judging section 61 makes output data selection signal SD active. When the selection signal SD is active, the dummy data DD is supplied as selected data DOS to the FIFO core section 64 through the output data selection 63. When the signal SD is inactive, the output data DO from the formatter 21B is supplied likewise. The selected data DOS supplied to the FIFO core section 64 is supplied as output data DO1 to the output buffer 65, and when data output permission signal ADO output from the FIFO core section 64 becomes active, the data DOS is output to data transfer bus 27. Meanwhile, as in the prior art the DMA controller 25 causes transfer of normal and dummy data from the FIFO 26A to the buffer memory 4.

In the above operation of this embodiment, the time of dummy data transfer to the FIFO 26A caused by the formatter 21B is substantially made zero. Thus, the data transfer end status data SED can be generated substantially at the same timing as the generation of the sync/re-sync mark detection failure status data S12/R14 which is earlier than in the case of the first embodiment, thus wider opening of the re-sync mark detection window.

As has been described in the foregoing, the disc controller according to the present invention includes re-sync mark detection window expanding means for controlling detection window control means in response to the supply of sync and re-sync mark detection failure status signals such as to advance the timing of opening the re-sync mark detection window to be earlier than the instant of generation of the sync or re-sync detection success status signal. Thus, it is possible to improve the possibility of detection of the next re-sync mark after a re-sync mark detection failure.

Further, the amount of dummy data to be written in the buffer memory can be reduced, thus permitting alleviation of the burden on the error detection detector/corrector. Further, with the improvement of the re-sync mark detection success possibility, it is possible to permit use of the sectors, which correspond to sync mark detection failure, thus permitting improvement of the disc utility.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A disc controller comprising:
   disc drive controller means including:
      a drive mechanism for driving a disc recording medium and a write/read head;
      disc interface means for supplying a write data signal as write target data formatted in a predetermined format to the disc drive controller means and receiving a read signal therefrom;
      data formatting means for generating the write data signal from an input and supplying the write data signal to the disc interface means and for receiving the read signal from the disc interface means to output the read signal as a predetermined read signal;
      first-in-first-out (FIFO) means for holding the read data in a buffer memory; and
      direct-memory-access (DMA) controller means for controlling the transfer of data to the buffer memory,
   said disc interface means including:
      sync/re-sync mark detection status signal generating means for generating first and second sync mark detection status signals representing a start of a read data area and respectively corresponding to the success and failure of a sync mark for synchronization and also for generating first and second re-sync mark detection status signals respectively corresponding to success and failure of a first one of re-sync marks for re-synchronization each inserted for each cycle of the read data; and
      detection window opening means for opening a re-sync mark detection window for detecting a second re-sync mark in response to a data transfer end status signal indicative of an end of transfer of the read data,
   said data formatting means including:
      read data transferring means for transferring at a predetermined first transfer rate to the FIFO means a predetermined first number of read data between the sync mark and the first re-sync mark in response to the supply of the first sync mark detection status signal and the first number of read data between the first and the next second re-sync marks and also for generating the data transfer end status signal for each transfer of the first number of pieces of data is ended,
   said disc controller further comprising:
      re-sync mark detection window expanding means for controlling the detection window opening means to advance a timing of opening the re-sync mark detection window for detection of the second re-sync mark in response to the supply of the second sync and re-sync mark detection status signals with respect to an instance of generation of the first sync or re-sync mark detection status signal;
      dummy data generating Means for causing the re-sync mark detection window expanding means to generate dummy data substituting for the read data;
      detection failure judging means for generating a detection failure signal when judging a failure of detection of the sync and re-sync marks; and
      dummy data transferring means for transferring the dummy data at a second rate of transfer rate higher than the first rate of transfer in response to the supply of the detection failure signal and generating the data transfer end status signal whenever the transfer of the predetermined number of dummy data is ended.

2. The disc controller according to claim 1, wherein said re-sync mark detection window expanding means comprises the DMA controller means including:

detection failure judging means for generating a detection failure signal when judging a failure of detection of the sync and re-sync marks;

transfer address updating means for updating the transfer address value in the buffer memory for storing the read data by an amount corresponding to a predetermined value; and DMA control core means for controlling a transfer of the read data from the FIFO means to the buffer memory.

3. The disc controller according to claim 1, wherein said re-sync mark detection window expanding means comprises the FIFO means including:

dummy data generating means for generating dummy data substituting for the read data;

detection failure judging means for generating a detection failure signal when judging the failure of detection of the sync and re-sync marks in response to the supply of the second sync and re-sync mark detection status signals; and selective output means for selectively supplying dummy data and read out data to an internal memory means if there is the detection failure signal.

4. The disc controller according to claim 1, further comprising:

frequency dividing means for generating a dummy data transfer timing signal corresponding to the second rate of transfer for every predetermined count of a clock signal received by the dummy data transferring means; and dummy data output control means for controlling the output of the dummy data in response to the detection failure signal and the dummy data transfer timing signal.

5. A transfer function unit for a disc controller, comprising:

detection status judgement means for determining if said disc controller detected a sync mark or a re-sync mark on a disk being read, said detection status judgement means for outputting a success signal if a sync mark or a re-sync mark is detected and for outputting a failure signal if a sync mark or a re-sync mark is not detected;

a first output controller responsive to said success signal for transferring data read from the disk to an output buffer; and a second output controller, faster than said first output controller responsive to said failure signal for transferring dummy data to said output buffer.

6. A transfer function unit for a disc controller, as recited in claim 5, further comprising:

a frequency divider connected to said first output controller and to said second output controller, said frequency divider outputting a first timing signal for causing said first output controller to transfer the data read from the disk at a first data transfer rate, and for outputting a second timing signal for causing said second output controller to transfer the dummy data at a second data transfer rate which is faster than said first data transfer rate.

7. A transfer function unit for a disc controller, as recited in claim 5, wherein said detection status judgement means comprises:

first logic means for generating the success signal in response to one of a sync mark detection signal and a re-sync mark detection signal; and second logic means for generating the failure signal in response to one of a sync mark detection failure signal and a re-sync mark detection failure signal.

8. A transfer function unit for a disc controller, as recited in claim 7 wherein said first logic means comprises an OR gate.

9. A transfer function unit for a disc controller, as recited in claim 7 wherein said second logic means comprises an OR gate.

10. A transfer function unit for a disc controller, as recited in claim 6 wherein said first output controller comprises:

logic means, receiving the success signal and the first timing signal, for enabling a buffer gate for transferring the data read from the disk to the output buffer; and a counter for counting the first timing signal and for outputting a data transfer completion signal at a predetermined count.

11. A transfer function unit for a disc controller, as recited in claim 10 wherein said logic means comprises an AND gate.

12. A transfer function unit for a disc controller, as recited in claim 6 wherein said second output controller comprises:

logic means, receiving the failure signal and the second timing signal, for enabling a buffer gate for transferring the dummy data to the output buffer; and a counter for counting the first timing signal and for outputting a data transfer completion signal at a predetermined count.

13. A transfer function unit for a disc controller as recited in claim 12 wherein said logic means comprises an AND gate.

* * * * *